UNITED STATES PATENT OFFICE.

WILLIAM L. DUDLEY, OF COVINGTON, KENTUCKY, ASSIGNOR OF ONE-HALF TO JAMES P. WITHEROW, OF PITTSBURG, PENNSYLVANIA.

LINING FOR CONVERTERS AND FURNACES.

SPECIFICATION forming part of Letters Patent No. 350,919, dated October 19, 1886.

Application filed August 27, 1885. Serial No. 175,496. (No specimens.)

*To all whom it may concern:*

Be it known that I, WILLIAM L. DUDLEY, of Covington, in the county of Kenton and State of Kentucky, have invented a new and useful Improvement in Linings for Converters and Furnaces; and I do hereby declare the following to be a full, clear, and exact description thereof.

The object of my invention is the production of a neutral lining for furnaces, hearths, converters, and other vessels used for the treatment of molten iron, as distinguished from an acid or basic lining—that is, a lining which will not be attacked either by an acid or by a base. In a vessel so lined the lining will not be wasted either by the silica in the iron or by basic additions, such as lime, &c., which are charged for the purpose of removing the phosphorus or other impurities in the bath.

Another object of my invention is to obtain a lining capable of resisting high temperatures.

My improved lining is composed of aluminium oxide and ferric oxide, together with refractory clay and carbonaceous material. The ferric oxide may be ordinary iron ore of one of the purer varieties, or chrome or titanium ore. These ingredients, if hydrous, are calcined. If anhydrous and free from volatile substances, the calcination is unnecessary. They are pulverized and mixed together, preferably in the proportions of two parts of aluminium oxide to one part of ferric oxide. This may be done before or after calcining, as may be preferred. From six to eight per cent. of refractory fire-clay and carbonaceous matter may be then mixed with the oxides with sufficient water to make the mass plastic. The carbonaceous matter may be plumbago, pulverized charcoal or coke, molasses, tar, or other preferred form, and it has the proportion, in quantity, to the fire-clay of about one to four. If tar is used, no water is added. The purpose of the addition of the fire-clay is to afford a temporary binder for the mass while it is being molded to shape or rammed into place, and the purpose of the carbon is to effect the reduction of a sufficient amount of the oxide of iron to harden the lining under the heat and prevent its rapid wear by the attrition or washing of the charge in the furnace, and to cement and bind it, so as to prevent its cracking or spalling with the heat. The plastic mass thus made may be molded into bricks and baked, and the converter or furnace lined with the same, a cement of the same composition being used as mortar; or it may be used in a plastic condition, being rammed in the bottom or hearth of the converter or furnace and thoroughly dried and burned, as will be understood.

Instead of using aluminium oxide, aluminium hydrate may be employed. Then, when the oxide of iron and the hydrate have been pulverized, they are calcined, which operation drives off the water and converts the hydrate into an oxide. The calcination may be done before or after the mixing of these two ingredients, as may be preferred. The lining is the same whether the initial form is aluminium oxide or aluminium hydrate.

The relative proportions of aluminium oxide and ferric oxide may be varied considerably; but an increased proportion of the former will increase the expense of the lining, while an increased proportion of the latter will detract from the refractory character of the lining; hence I prefer the proportions named.

The quantity of fire-clay used will depend upon the amount needed for the easy working of the plastic material, either in molding the bricks or ramming the bottom. If the amount of carbonaceous matter present is more than is necessary to effect the reduction of a sufficient proportion of the ferric oxide for the purpose stated, the excess will permeate the lining. The lining thus made is possessed of the properties before mentioned, and enables the converting-vessel to be used a long time without the trouble and expense of relining.

I am aware that a small percentage of alumina and oxide of iron have been employed in the manufacture of basic linings, as described in Letters Patent No. 218,336, granted to S. G. Thomas, August 5, 1879.

What I claim as my invention, and desire to secure by Letters Patent, is—

1. A neutral lining for furnaces, converters, and other vessels in which molten iron is treated, consisting of aluminium oxide, oxide of iron, and fire-clay, substantially as and for the purposes described.

2. A neutral lining for furnaces, converters, &c., consisting of aluminium oxide, oxide of iron, fire-clay, and carbonaceous matter, substantially as and for the purposes described.

In testimony whereof I have hereunto set my hand this 25th day of August, A. D. 1885.

WILLIAM L. DUDLEY.

Witnesses:
R. H. WHITTLESEY,
THOMAS B. KERR.